US011404202B2

(12) United States Patent
Okazaki et al.

(10) Patent No.: US 11,404,202 B2
(45) Date of Patent: Aug. 2, 2022

(54) PLANAR TRANSFORMER AND DC-DC CONVERTER

(71) Applicants: Marelli Corporation, Saitama (JP); National University Corporation Hokkaido University, Sapporo (JP); Utsunomiya University, Utsunomiya (JP)

(72) Inventors: Fumihiro Okazaki, Saitama (JP); Satoshi Ogasawara, Sapporo (JP); Hirohito Funato, Utsunomiya (JP)

(73) Assignees: Marelli Corporation, Saitama (JP); National University Corporation Hokkaido University, Sapporo (JP); Utsunomiya University, Utsunomiya (JP)

( * ) Notice: Subject to any disclaimer, the term of this patent is extended or adjusted under 35 U.S.C. 154(b) by 419 days.

(21) Appl. No.: 16/630,071

(22) PCT Filed: Jul. 6, 2018

(86) PCT No.: PCT/JP2018/025717
§ 371 (c)(1),
(2) Date: Jan. 10, 2020

(87) PCT Pub. No.: WO2019/013131
PCT Pub. Date: Jan. 17, 2019

(65) Prior Publication Data
US 2020/0211765 A1 Jul. 2, 2020

(30) Foreign Application Priority Data

Jul. 14, 2017 (JP) .............................. JP2017-137997

(51) Int. Cl.
*H01F 27/32* (2006.01)
*H01F 3/14* (2006.01)
(Continued)

(52) U.S. Cl.
CPC ............. *H01F 27/326* (2013.01); *H01F 3/14* (2013.01); *H01F 27/2804* (2013.01);
(Continued)

(58) Field of Classification Search
CPC ...... H01F 27/326; H01F 3/14; H01F 27/2804; H01F 27/346; H02M 3/33576
See application file for complete search history.

(56) References Cited

U.S. PATENT DOCUMENTS

2008/0197957 A1* 8/2008 Kondo ...................... H01F 5/04
336/200
2009/0267721 A1* 10/2009 Okada ..................... H02J 50/90
336/232
2013/0154787 A1 6/2013 Maeda et al.

FOREIGN PATENT DOCUMENTS

JP S57152110 A 9/1982
JP S61188338 U 11/1986
(Continued)

*Primary Examiner* — Adolf D Berhane
*Assistant Examiner* — Afework S Demisse
(74) *Attorney, Agent, or Firm* — Young Basile Hanlon & MacFarlane, P.C.

(57) ABSTRACT

A planar transformer includes: a primary side planar air core coil; a secondary side planar air core coil; a primary side planar core; and a secondary side planar core. The secondary side planar air core coil is arranged so as to be spaced from the primary side planar air core coil in the winding center axis direction of the primary side planar air core coil, the secondary side planar air core coil having a non-facing portion configured not to face the primary side planar air core coil in the winding center axis direction. The primary side planar core and the secondary side planar core are stacked on outer sides of the primary side planar air core coil and the secondary side planar air core coil in the directions of the winding center axes, respectively.

5 Claims, 6 Drawing Sheets

(51) Int. Cl.
 *H01F 27/28* (2006.01)
 *H01F 27/34* (2006.01)
 *H02M 3/335* (2006.01)
(52) U.S. Cl.
 CPC ...... *H01F 27/346* (2013.01); *H02M 3/33576* (2013.01); *H01F 2027/2819* (2013.01)

(56) References Cited

FOREIGN PATENT DOCUMENTS

| | | | |
|---|---|---|---|
| JP | H05326295 | A | 12/1993 |
| JP | 2000243637 | A | 9/2000 |
| JP | 2013080881 | A | 5/2013 |

\* cited by examiner

PLANAR TRANSFORMER AND DC-DC CONVERTER

CROSS-REFERENCE TO RELATED APPLICATION

This application claims priority to Japanese Patent Application No. 2017-137997 filed Jul. 14, 2017, the entire disclosure of which is hereby incorporated by reference.

TECHNICAL FIELD

The present invention relates to a planar transformer.

BACKGROUND

For example, in an isolated DC-DC converter utilizing an asymmetrical half-bridge LLC converter, a leakage inductance of a transformer and a resonant capacitor must be in a series resonance at high frequency. Therefore, in the isolated DC-DC converter, the leakage inductance of the transformer needs to be increased in accordance with the large-capacity resonant capacitor for high frequency.

As a proposal for a voltage converter capable of adjusting the leakage inductance of the transformer, there is a known voltage converter that is configured so as to control the leakage inductance by providing a secondary core and by adjusting a degree of insertion of a core piece with respect to a gap of the secondary core on which a secondary side coil of the voltage converter is wound (JPS61-188338U).

SUMMARY

However, because the above-described voltage converter is configured so as to actively generating the leakage inductance to the secondary side mainly, it is possible that sufficient leakage inductance cannot be ensured in the transformer as a whole.

An object of the present invention is to ensure sufficient leakage inductance.

According to one aspect of the present invention, a planar transformer includes: a primary side planar air core coil; a secondary side planar air core coil arranged so as to be spaced from the primary side planar air core coil in an winding center axis direction of the primary side planar air core coil, the secondary side planar air core coil having a non-facing portion configured not to face the primary side planar air core coil in the winding center axis direction; and a primary side planar core and a secondary side planar core stacked on outer sides of the primary side planar air core coil and the secondary side planar air core coil, respectively, in the winding center axis direction.

According to one aspect of the present invention, a planar transformer capable of sufficiently ensuring leakage inductance can be provided.

DETAILED DESCRIPTION

Figure 1:
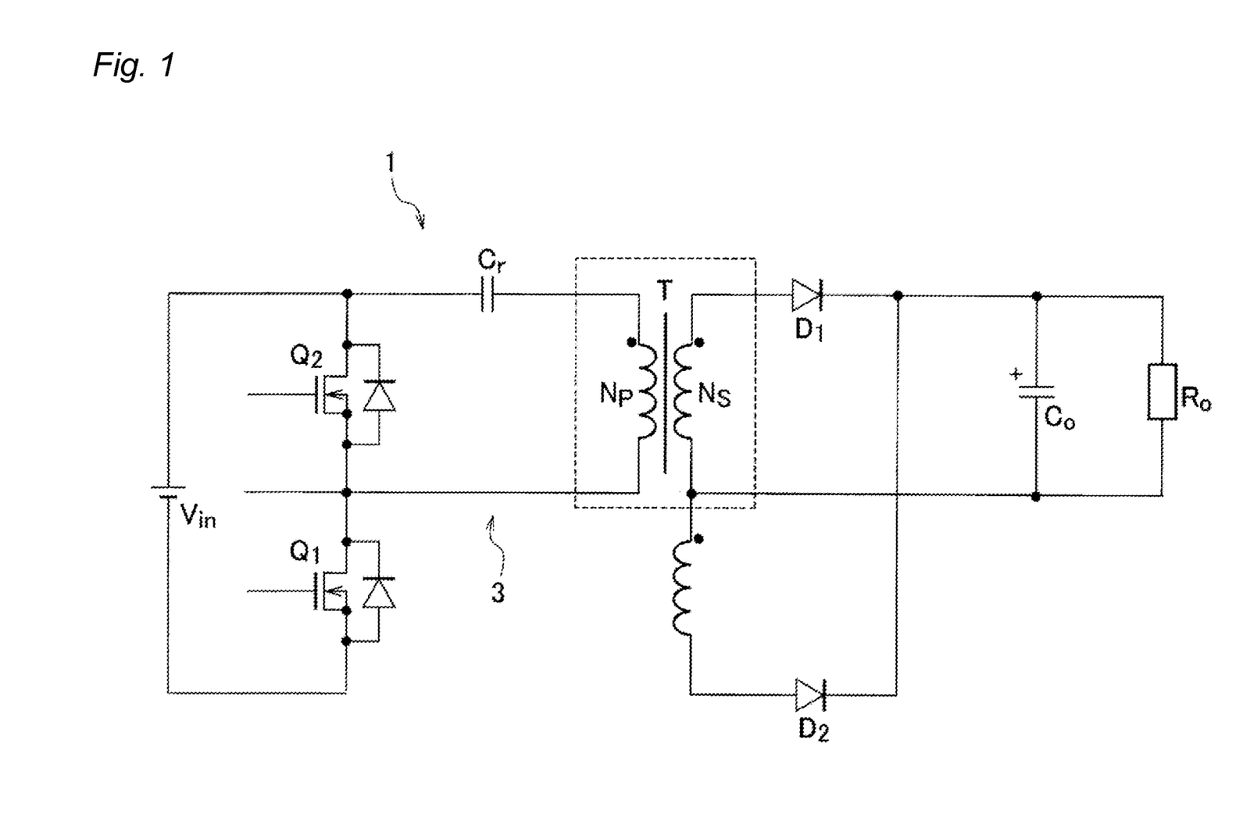
FIG. 1 is a circuit diagram showing a DC-DC converter utilizing a planar transformer according to an embodiment of the present invention.

An embodiment of the present invention will be described below with reference to the drawings. FIG. 1 is a circuit diagram showing DC-DC converter utilizing a planar transformer according to an embodiment of the present invention.

A DC-DC converter 1 according to this embodiment shown in FIG. 1 is an isolated DC-DC converter in which an asymmetrical half-bridge LLC converter 3 is used on the primary side of a transformer T.

In the DC-DC converter 1, direct-current voltage Vin input to the primary side is converted to alternating current by switching by semiconductor devices Q1 and Q2, which are formed with MOSFET, etc., of the LLC converter 3, the voltage of the alternating current is increased between coils Np and Ns on the primary side and the secondary side of the transformer T, and thereafter, the alternating current is returned to the direct current by rectifier Diodes D1 and D2 and a smoothing capacitor Co and supplied to a load Ro on the secondary side.

At this time, the semiconductor devices Q1 and Q2 are switched on and off alternately at the period of resonance frequency of series resonant circuit of the leakage inductance of the primary side coil Np and a resonant capacitor Cr, and thereby, it is possible to suppress switching loss at the LLC converter 3 and to increase the direct-current voltage Vin at a high efficiency.

The DC-DC converter 1 is configured with a resonant circuit, and the semiconductor devices Q1 and Q2 are switched on and off at a high frequency ("high frequency" in this context is equal to or higher than 1 MHz). In addition, in order to establish the resonant circuit at the high frequency, very low excitation inductance (for example, when driven at 2 MHz, 0.8 pH) and large leakage inductance (for example, when driven at 2 MHz, 1.1 pH) are required.

Figure 2A:
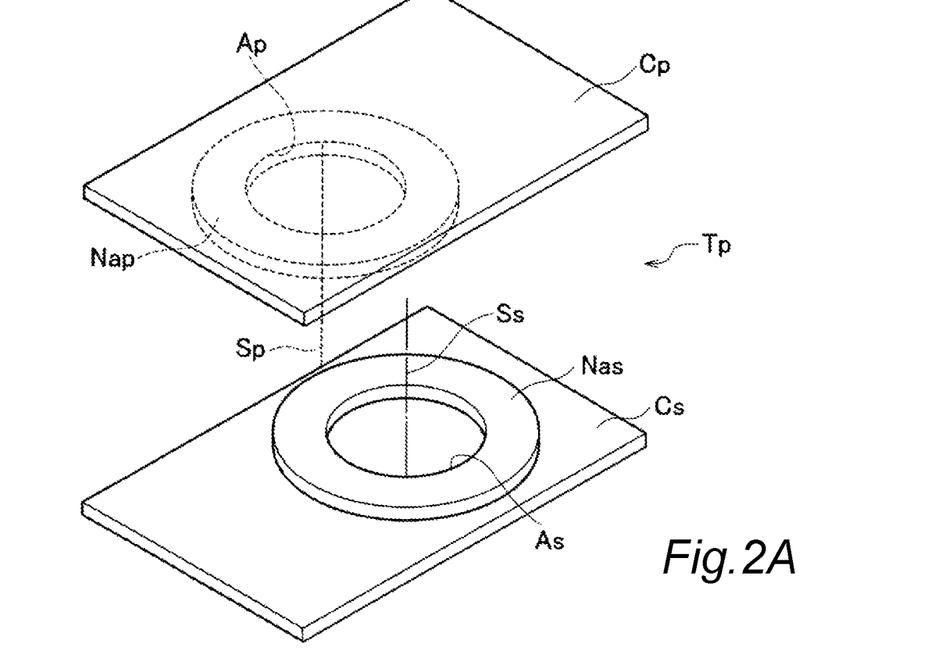
FIG. 2A shows an exploded perspective view of the planar transformer forming the transformer shown in FIG. 1.

Thus, in the DC-DC converter 1 of this embodiment, a planar transformer is employed as the transformer T. A configuration of the planar transformer will be described below with reference to FIGS. 2A to 2C. FIG. 2A shows an exploded perspective view of the planar transformer forming the transformer T, FIG. 2B is a side view of the planar transformer, and FIG. 2C is a plan view of the planar transformer.

A planar transformer Tp in an example shown in FIG. 2A has a primary side planar core Cp made of magnetic material, a primary side planar air core coil Nap made of metal stacked on the primary side planar core Cp, a secondary side planar core Cs made of magnetic material, and a secondary side planar air core coil Nas made of metal stacked on the secondary side planar core Cs.

The primary side planar air core coil Nap and the secondary side planar air core coil Nas are formed to have ring shapes having the same diameter and are arranged non-coaxially. In addition, the primary side planar core Cp and the secondary side planar core Cs are formed to have rectangular shapes having the same size. The primary side planar core Cp and the secondary side planar core Cs have external shapes larger than the outer diameters of the primary side planar air core coil Nap and the secondary side planar air core coil Nas.

Figure 2B:
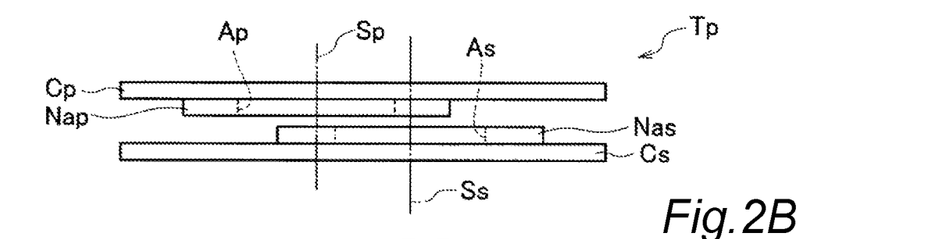
FIG. 2B shows a side view of the planar transformer shown in FIG. 1.
Figure 2C:
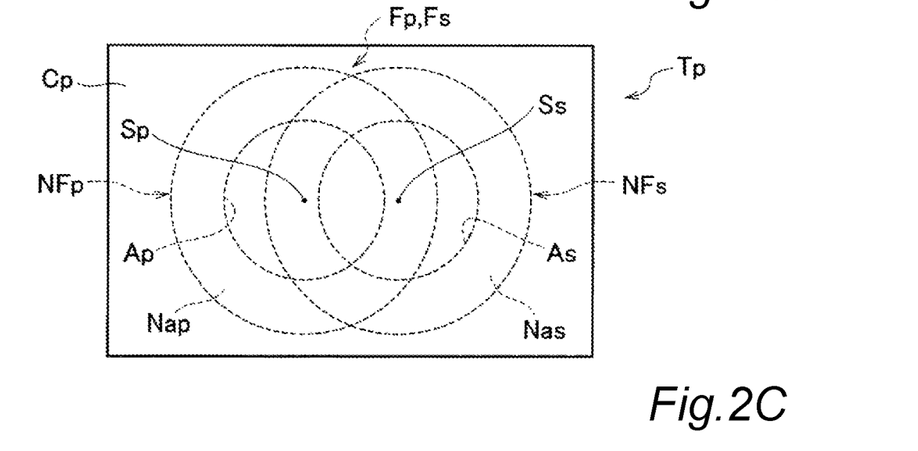
FIG. 2C shows a plan view of the planar transformer shown in FIG. 1.

As shown in FIG. 2B, the primary side planar core Cp is arranged so as to oppose with the secondary side planar core Cs such that a space is formed therebetween. The primary side planar air core coil Nap and the secondary side planar air core coil Nas are respectively stacked on mutually facing surfaces of the primary side planar core Cp and the secondary side planar core Cs.

The primary side planar air core coil Nap and the secondary side planar air core coil Nas are arranged such that a gap is formed therebetween in the direction of the space between the primary side planar core Cp and the secondary side planar core Cs, in other words, in the respective axial directions of winding center axes Sp and Ss. In addition, the primary side planar air core coil Nap and the secondary side planar air core coil Nas are arranged such that respective positions of the winding center axes Sp and Ss are displaced from each other in the radial direction orthogonal to the winding center axes Sp and Ss such that respective air cores Ap and As are partially overlapped.

By having such an arrangement, as shown in FIG. 2C, the primary side planar air core coil Nap is provided with a facing portion Fp at which the primary side planar air core coil Nap overlaps with the secondary side planar air core coil Nas in the radial direction of the winding center axis Sp and a non-facing portion NFp positioned at the outer side of the secondary side planar air core coil Nas.

Similarly, the secondary side planar air core coil Nas is provided with a facing portion Fs at which the secondary side planar air core coil Nas overlaps with the primary side planar air core coil Nap in the radial direction of the winding center axis Ss and a non-facing portion NFs positioned at the outer side of the primary side planar air core coil Nap.

In each of FIGS. 2A to 2C, illustrations of terminal portions of the respective planar air core coils Nap and Nas are omitted.

Figure 3A:
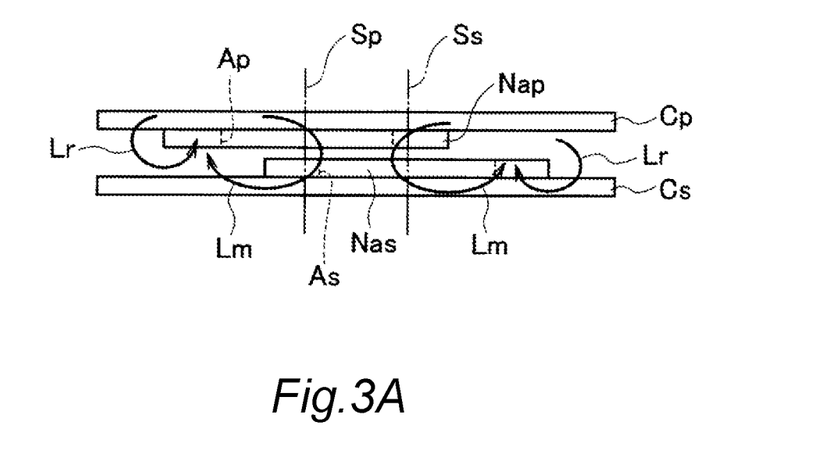
FIG. 3A is an explanatory diagram showing leakage inductance and excitation inductance generated in planar air core coils on the primary side and secondary side of the planar transformer having an arrangement shown in FIG. 2.

As described above, by arranging the primary side planar air core coil Nap and the secondary side planar air core coil Nas so as to be displaced from each other in the radial direction of the winding center axes Sp and Ss, as shown in an explanatory diagram in FIG. 3A, excitation inductance Lm is generated at the facing portions Fp and Fs and leakage inductance Lr is generated at the non-facing portions NFp and NFs between both planar air core coils Nap and Nas.

Figure 3B:
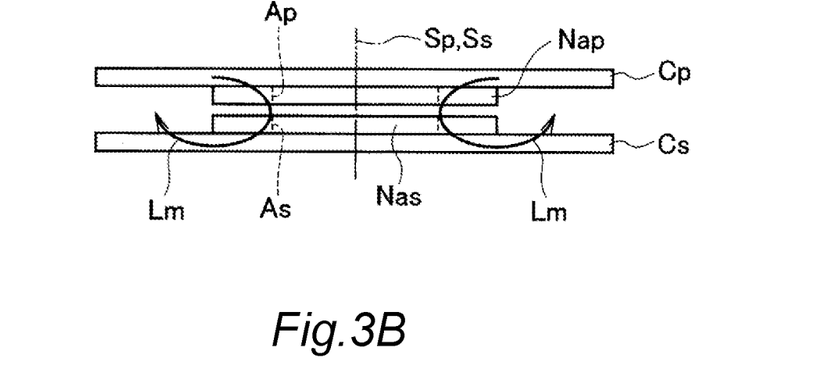
FIG. 3B is an explanatory diagram showing the leakage inductance and the excitation inductance generated in the primary side and secondary side planar air core coils opposed to each other.

If the primary side planar air core coil Nap and the secondary side planar air core coil Nas are arranged such that the winding center axes Sp and Ss coincide in the radial direction, as shown in an explanatory diagram in FIG. 3B, essentially only the excitation inductance Lm is generated at the facing portions Fp and Fs between the both planar air core coils Nap and Nas.

Therefore, as shown in FIG. 3A, the planar transformer Tp, in which the winding center axis Sp of the primary side planar air core coil Nap and the winding center axis Ss of the secondary side planar air core coil Nas are mutually displaced, is more suitable as the transformer T, in which the leakage inductance of the primary side coil Np is in series resonance with the resonant capacitor Cr in the LLC converter 3 shown in FIG. 1, than the planar transformer Tp shown in FIG. 3B, in which the winding center axis Sp of the primary side planar air core coil Nap is arranged coaxially with the winding center axis Ss of the secondary side planar air core coil Nas.

Figure 4:
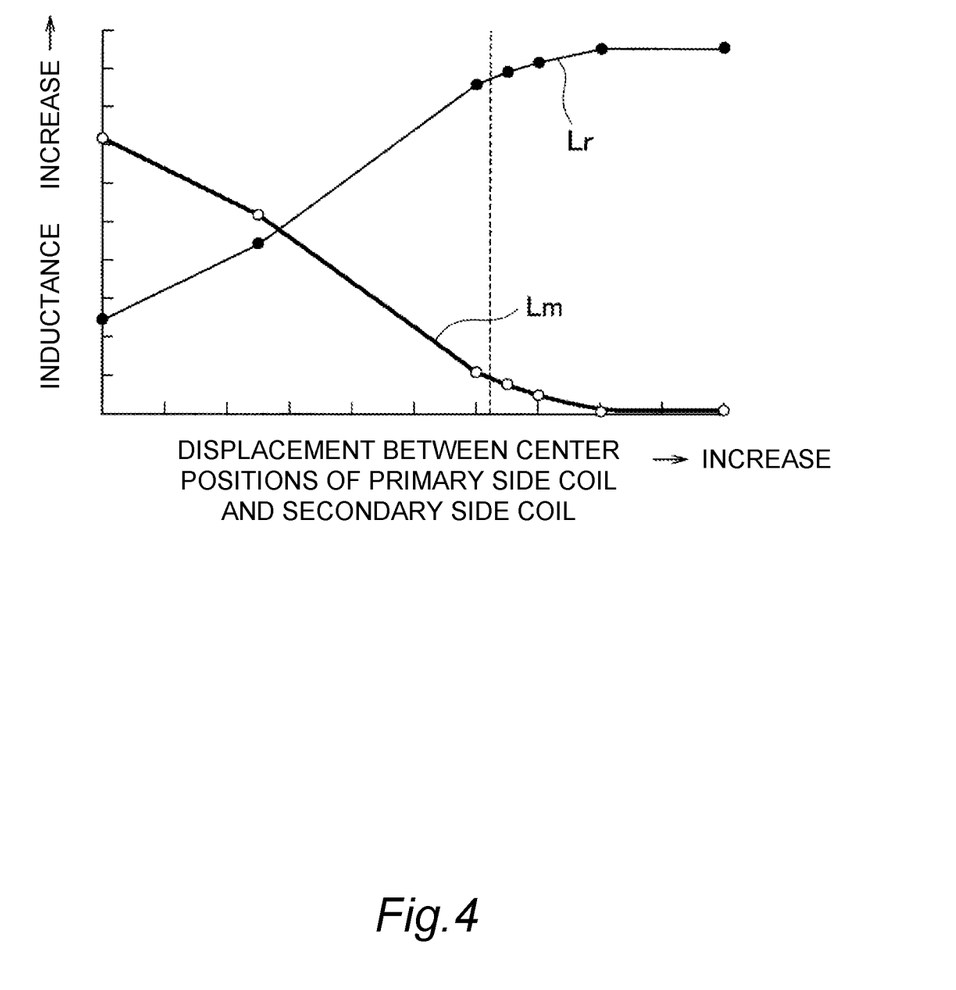
FIG. 4 is a graph showing correlation between intensities of leakage inductance and excitation inductance generated in the primary side and secondary side planar air core coils shown in FIG. 2 and a displaced distance between winding center axes of both planar air core coils.

In the planar transformer Tp shown in FIG. 3A, as shown in a graph in FIG. 4, as a displaced distance between the primary side planar air core coil Nap and the secondary side planar air core coil Nas is increased, the leakage inductance Lr generated between them is increased, and the excitation inductance Lm is decreased. The displacement between the primary side planar air core coil Nap and the secondary side planar air core coil Nas means the displacement between the winding centers of the both coils.

Thus, as the transformer T shown in FIG. 1, there is provided the planar transformer Tp having the displaced distance between the both planar air core coils Nap and Nas on the primary side and secondary side shown in FIG. 3A so as to cause the leakage inductance Lr large enough to cause series resonance with the resonant capacitor Cr shown in FIG. 1 and the excitation inductance Lm large enough to satisfy a coupling coefficient required between the coils Np and Ns on the primary side and secondary side shown in FIG. 1.

A magnetic coupling between the primary side planar air core coil Nap and the secondary side planar air core coil Nas can be achieved when at least a part of the coils face each other even if the air cores Ap and As are not facing each other. Therefore, the displaced distance between the both planar air core coils Nap and Nas on the primary side and secondary side required to achieve desired leakage inductance Lr cab be set within a range up to the distance at which at least the outer edges of the both coils are overlapped with each other.

Figures 5A, 5B:
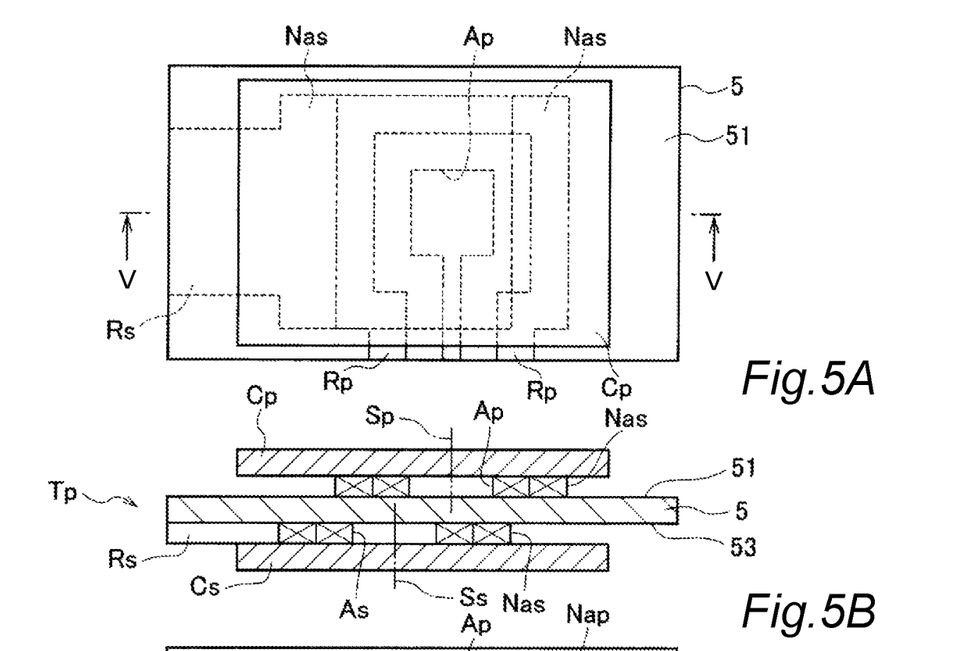
FIG. 5A shows a plan view of the planar transformer used as the transformer shown in FIG. 1.
FIG. 5B shows a sectional view taken along line I-I in FIG. 5A.

Next, a specific configuration of the planar transformer Tp used as the transformer T shown in FIG. 1 will be described with reference to FIGS. 5A to 5D. FIG. 5A is a plan view of the planar transformer Tp, FIG. 5B is a sectional view taken along the line V-V in FIG. 5A, FIG. 5C is a plan view showing a front surface side of a substrate formed with the primary side planar core, and FIG. 5D is a plan view showing a back surface side of the substrate formed with the secondary side planar core.

As shown in FIG. 5B, which is the sectional view of FIG. 5A taken along the line I-I, the planar transformer Tp of this embodiment shown in FIG. 5A has a substrate 5 in which the primary side planar air core coil Nap and the secondary side planar air core coil Nas are formed on a front surface 51 and a back surface 53, respectively. The substrate 5 is formed to have a rigid structure from insulating resin materials such as glass epoxy, etc., for example.

Figure 5C:
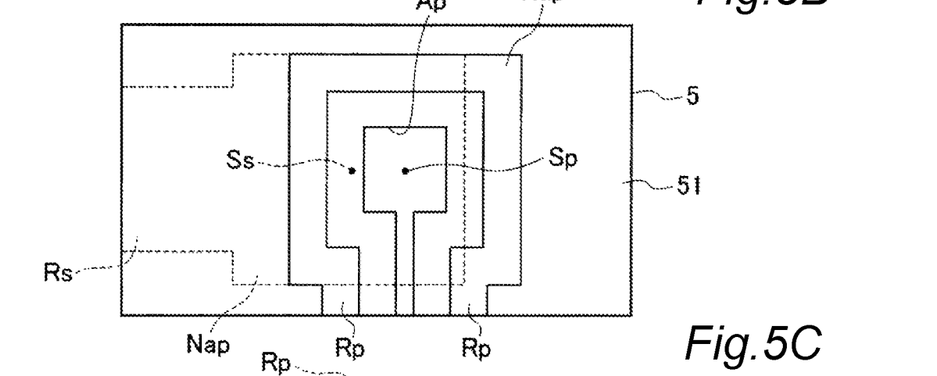
FIG. 5C shows a plan view showing a front surface side of a substrate formed with a primary side planar core.
Figure 5D:
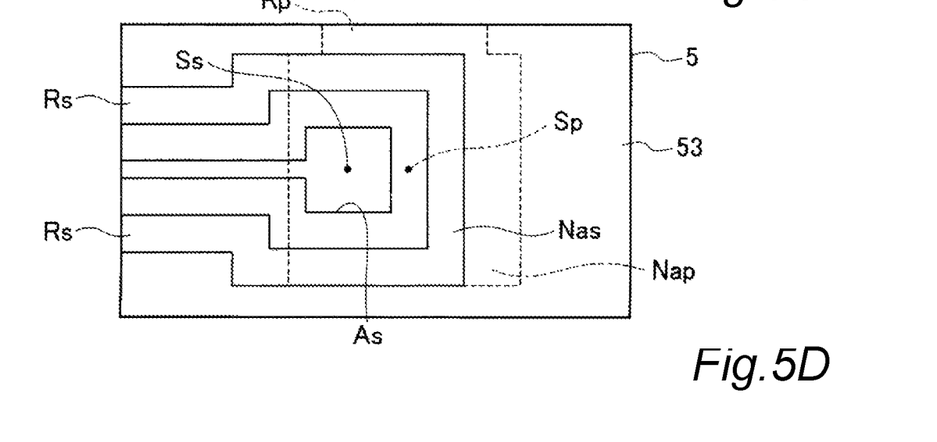
FIG. 5D shows a plan view showing a back surface side of the substrate formed with a secondary side planar core.

In the primary side planar air core coil Nap formed on the front surface 51 of the substrate 5, terminal parts Rp are provided on both ends of a conductor, which is looped in a square shape as shown in FIG. 5C, so as to extend to the long side of the front surface 51. On the other hand, in the secondary side planar air core coil Nas formed on the back surface 53 of the substrate 5 as shown in FIG. 5B, terminal parts Rs are provided on both ends of the conductor, which has the same shape as the primary side planar air core coil Nap that is looped in a square shape as shown in FIG. 5D, so as to extend to the short side of the back surface 53.

As described above, the terminal parts Rp of the primary side planar air core coil Nap and the terminal parts Rs of the secondary side planar air core coil Nas are arranged so as not to be overlapped with each other, and thereby, both of the terminal parts Rp and Rs are prevented from configuring a part of the magnetic circuit.

With the DC-DC converter 1 of this embodiment, because the planar transformer Tp configured as described above is used as the transformer T of the LLC converter 3, it is possible to increase the leakage inductance Lr generated in the primary side planar air core coil Nap and the secondary side planar air core coil Nas by increasing the displaced distance between both of the planar air core coils Nap and Nas.

In this example, the displacement between the primary side planar air core coil Nap and the secondary side planar air core coil Nas also means the displacement between the winding centers of the both coils.

In this example, it is also possible to drive the LLC converter 3 at the high frequency by generating, in the planar transformer Tp, the leakage inductance Lr that is large enough to cause the series resonance with the resonant capacitor Cr having the large capacity in accordance with the semiconductor devices Q1 and Q2 that undergo switching at the high frequency.

Furthermore, because the leakage inductance Lr generated in the primary side planar air core coil Nap and the secondary side planar air core coil Nas can be adjusted by the displaced distance between both of the planar air core coils Nap and Nas, it is possible to eliminate necessity of a highly accurate processing of the structure of the planar transformer Tp including the primary side planar core Cp and the secondary side planar core Cs.

In addition, the primary side planar core Cp and the secondary side planar core Cs do not have center poles to be inserted into the air cores Ap and As of the primary side planar air core coil Nap and the secondary side planar air core coil Nas. Therefore, both of the planar cores Cp and Cs can be arranged so as to oppose with each other so as to sandwich the air cores Ap and As of the primary side and secondary side planar air core coils Nap and Nas such that the space is formed therebetween in the axial direction of the respective winding center axes Sp and Ss of the planar air core coils Nap and Nas.

Therefore, in the planar transformer Tp of this embodiment, the magnetic flux passing through the primary side planar air core coil Nap and the secondary side planar air core coil Nas is prevented from being focused to the primary side planar core Cp and the secondary side planar core Cs.

Thus, in the non-facing portions NFp and NFs of the primary side planar air core coil Nap and the secondary side planar air core coil Nas shown in FIG. 2C, it is possible to surely generate the leakage inductance Lr of the intensity corresponding to the displaced distance between both of the planar air core coils Nap and Nas.

However, as long as it is possible to generate the leakage inductance Lr of the required intensity, the center poles to be inserted into the air cores Ap and As of the primary side and secondary side planar air core coils Nap and Nas may be provided in the primary side planar core Cp and the secondary side planar core Cs, and the primary side planar core Cp and the secondary side planar core Cs may be configured with an EE core and an EI core.

Furthermore, according to the DC-DC converter 1 of this embodiment, the primary side planar core Cp and the secondary side planar core Cs of the planar transformer Tp are formed to have the external shape that is larger than the outer diameters of the primary side planar air core coil Nap and the secondary side planar air core coil Nas.

By doing so, the leakage magnetic flux generated in the primary side planar air core coil Nap and the secondary side planar air core coil Nas can be retained in the planar transformer Tp, and thereby, it is possible to efficiently configure the leakage inductance Lr of the planar transformer Tp.

However, as long as it is possible to generate the leakage inductance Lr of the required intensity by completely covering magnetic path of the leakage magnetic flux generated in the primary side planar air core coil Nap and the secondary side planar air core coil Nas, the primary side planar core Cp and the secondary side planar core Cs may be formed to have the external shape that is smaller than the outer diameters of the primary side planar air core coil Nap and the secondary side planar air core coil Nas.

Figure 6:
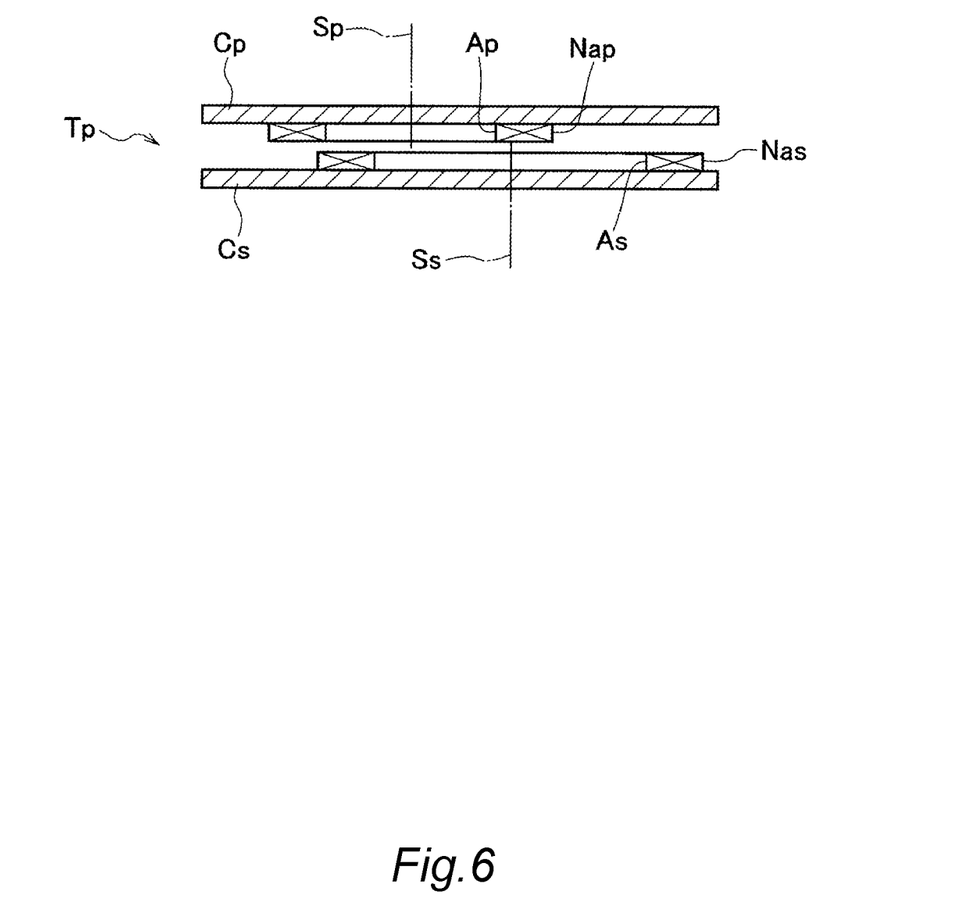
FIG. 6 is a sectional view of the planar transformer used as the transformer shown in FIG. 1, in which the planar air core coils on the primary side and the secondary side have different sizes.

In addition, in this embodiment, the primary side planar air core coil Nap and the secondary side planar air core coil Nas of the planar transformer Tp are formed to have the same shape except for the respective terminal parts Rp and Rs. However, as shown in a sectional view in FIG. 6 for example, the planar air core coils Nap and Nas may have different sizes on the primary side and the secondary side, or the planar air core coils Nap and Nas may have different number of turns on the primary side and the secondary side.

The primary side planar air core coil Nap and the secondary side planar air core coil Nas may be formed by an etching process, etc., and thereby, it is possible to perform the processing with high positional accuracy. In a case in which such a processing is performed, a reference part (for example, a through hole) may be formed at somewhere in the substrate 5.

By doing so, when the secondary side planar air core coil Nas is to be formed, it is possible to achieve a high displacement accuracy between the primary side planar air core coil Nap and the secondary side planar air core coil Nas by performing the processing such that the winding center of the planar air core coil Nas is displaced from the reference part by a predetermined distance.

The present invention is not limited to the transformer of an isolated DC-DC converter utilizing an asymmetrical half-bridge LLC converter, and the present invention can be widely applied to transformers of various types that are used in areas utilizing the leakage inductance.

Embodiments of the present invention were described above, the above embodiments are merely examples of applications of this invention, and the technical scope of this invention is not limited to the specific constitutions of the above embodiments.

An aspect of the present invention can be utilized in transformers of various types that are used in areas utilizing the leakage inductance.

1: DC-DC converter
3: LLC converter
5: substrate (insulating substrate)
51: substrate front surface (first surface)
53: substrate back surface (second surface)
Ap: air core of primary side planar air core coil
As: air core of secondary side planar air core coil
Co: smoothing capacitor Cp: primary side planar core
Cr: resonant capacitor
Cs: secondary side planar core
D1, D2: rectifier Diode
Fp, Fs: facing portion
Lm: excitation inductance
Lr: leakage inductance
Nap: primary side planar air core coil
Nas: secondary side planar air core coil
NFp, NFs: non-facing portion
Np: primary side coil
Ns: secondary side coil
Q1, Q2: semiconductor device
Ro: load
Rp: terminal part of primary side planar air core coil
Rs: terminal part of secondary side planar air core coil
Sp: winding center axis of primary side planar air core coil
Ss: winding center axis of secondary side planar air core coil
Tp: planar transformer
Vin: direct-current voltage

The invention claimed is:

1. A planar transformer comprising:
a primary side planar air core coil;
a secondary side planar air core coil arranged so as to be spaced from the primary side planar air core coil in an winding center axis direction of the primary side planar air core coil, the secondary side planar air core coil having a non-facing portion configured not to face the primary side planar air core coil in the winding center axis direction; and
a primary side planar core and a secondary side planar core stacked on outer sides of the primary side planar air core coil and the secondary side planar air core coil, respectively, in the winding center axis direction, wherein
the primary side planar air core coil and secondary side planar air core coil respectively have facing portions at which the primary side planar air core coil and secondary side planar air core coil face with each other in the winding center axis direction,
a position of a winding center axis of one of the primary side planar air core coil and the secondary side planar air core coil is arranged at outer side of an air core of another of the primary side planar air core coil and the secondary side planar air core coil, and
the primary side planar core and the secondary side planar core are arranged so as not to be in contact with each other by being spaced from each other.

2. The planar transformer according to claim 1, wherein the primary side planar core and the secondary side planar core are arranged so as to be spaced in the winding center axis direction, the primary side planar core and the secondary side planar core being arranged so as to sandwich, in the winding center axis direction, the facing portions of air core portions of the respective primary side planar air core coil and secondary side planar air core coil.

3. The planar transformer according to claim 1, wherein the primary side and secondary side planar cores respectively have external shapes larger than outlines of the respective primary side planar air core coil and secondary side planar air core coil on a plane perpendicular to the winding center axis direction.

4. The planar transformer according to claim 1 further comprising an insulating substrate provided between the primary side planar air core coil and the secondary side planar air core coil in the winding center axis direction, wherein the primary side planar air core coil is formed on a first surface of the insulating substrate, and the secondary side planar air core coil is formed on a second surface of the insulating substrate on the opposite side from the first surface.

5. A DC-DC converter comprising the planar transformer according to claim 1 as a transformer of an isolated DC-DC converter utilizing an LLC converter.

* * * * *